Oct. 28, 1930.                H. MORGAN                 1,779,945
                          BRAKE TESTING APPARATUS
                        Filed March 12, 1927      2 Sheets-Sheet 1
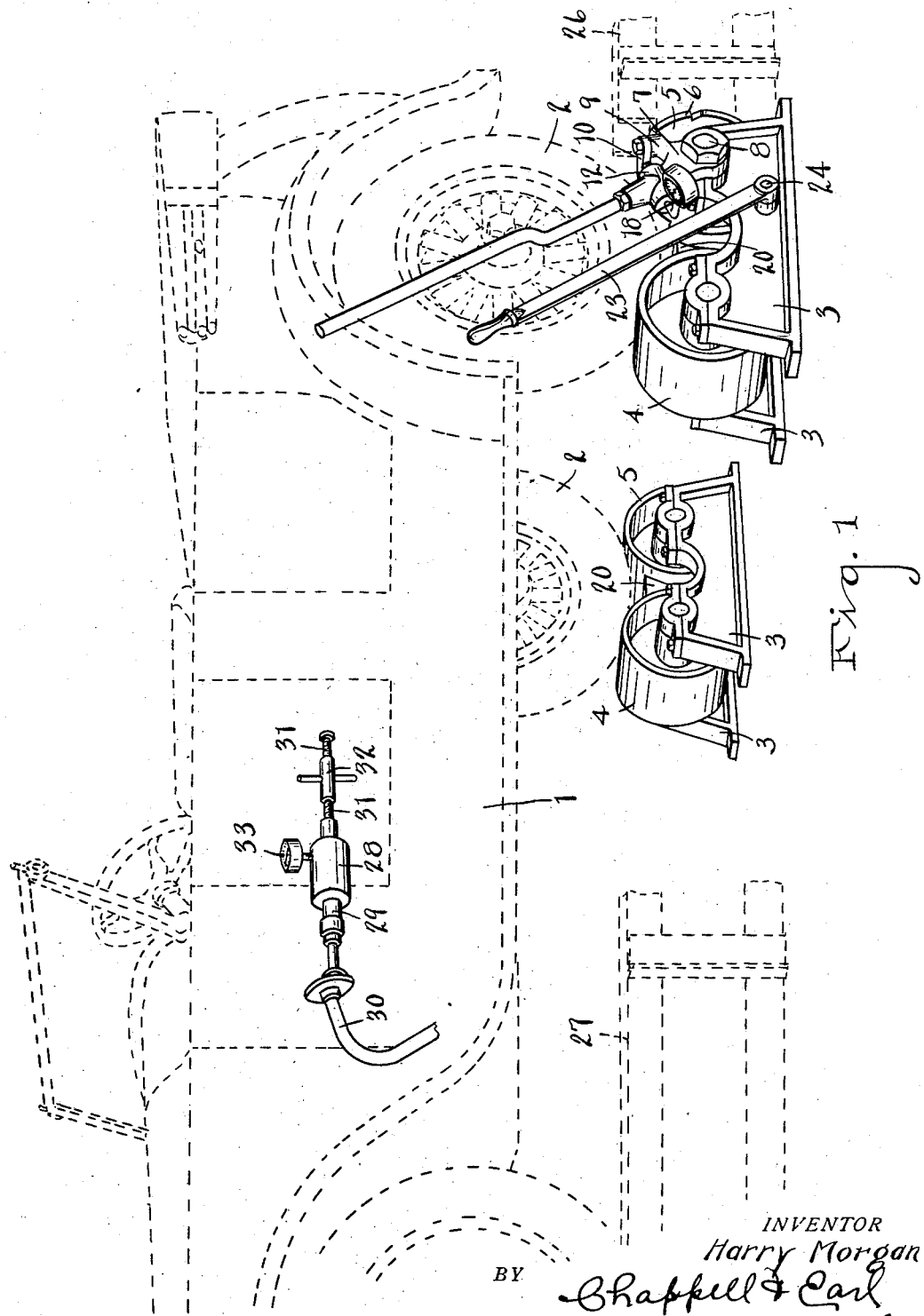
INVENTOR
Harry Morgan
BY Chappell & Earl
ATTORNEYS

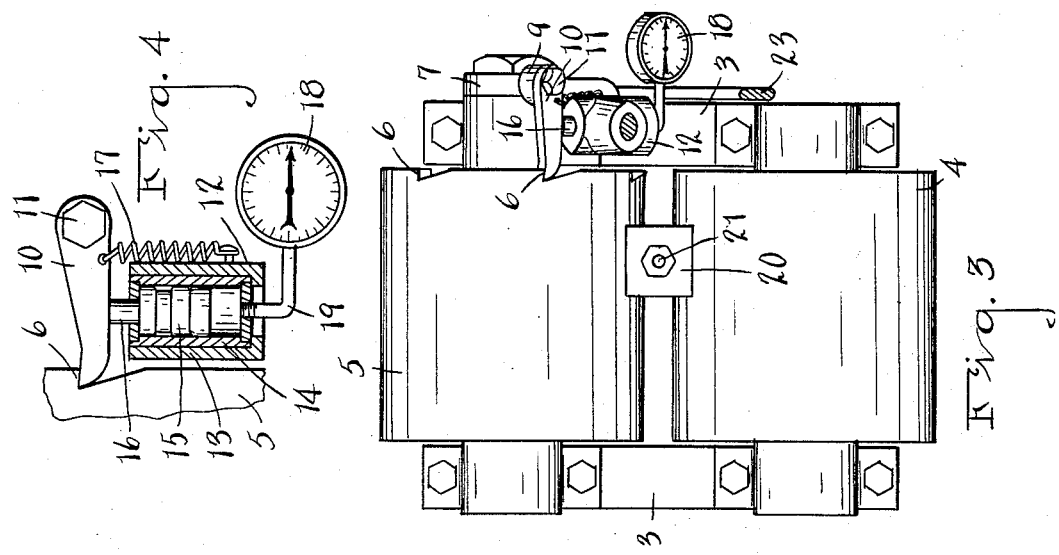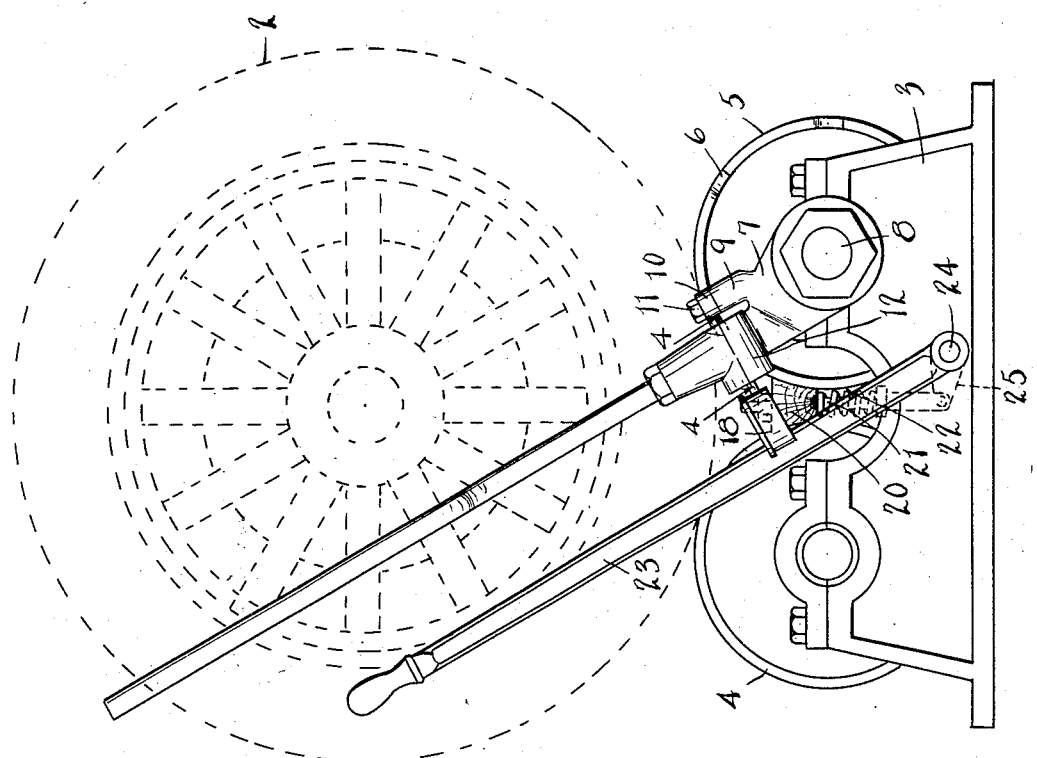

Patented Oct. 28, 1930

1,779,945

UNITED STATES PATENT OFFICE

HARRY MORGAN, OF FLINT, MICHIGAN, ASSIGNOR TO BRAKE-TESTING EQUIPMENT CORPORATION, OF SAN FRANCISCO, CALIFORNIA, A CORPORATION OF CALIFORNIA

BRAKE-TESTING APPARATUS

Application filed March 12, 1927. Serial No. 174,786.

The main objects of this invention are:

First, to provide a brake testing means for motor vehicles which enables the rapid and accurate testing of brakes and the accurate adjustment thereof.

Second, to provide a brake testing means for motor vehicles having these advantages which is simple and economical in structure and durable in operation.

Objects pertaining to details and economies of my improvements will definitely appear from the detailed description to follow. The invention is defined and pointed out in the claims.

A structure embodying the features of my invention is clearly illustrated in the accompanying drawing in which:

Fig. 1 is a perspective view of a brake testing apparatus embodying the features of my invention, an automobile being shown by dotted lines in operative relation to the apparatus.

Fig. 2 is a side elevation of one of my improved brake testing units, a wheel being shown by dotted lines in operative relation thereto.

Fig. 3 is a plan view of one of my improved brake testing units, the levers being partially broken away.

Fig. 4 is a detail section on a line corresponding to line 4—4 of Fig. 2.

Referring to the drawing, 1 represents an automobile and 2, 2 the rear wheels thereof. As the testing units are duplicates a description of one will suffice.

I provide a base consisting of a pair of pedestals 3 having bearings for the shafts of the drums 4 and 5, these drums being supported in spaced relation to support a wheel as 2. The drum 5 is provided with a series of ratchet teeth 6 formed on the edge of the rim of the drum.

The lever head 7 is pivotally and oscillatingly mounted upon the projecting end 8 of the shaft for the drum 5. This lever head member 7 is provided with a forwardly projecting arm 9 on which the pawl 10 is mounted by means of the pivot 11 so that the pawl coacts with the teeth 6 of the drum 5.

A fluid cylinder designated generally by the numeral 12 is carried by the lever head. This cylinder comprises an outer shell 13 formed as a part of the head casting and a lining or cylinder proper 14. This cylinder is adapted to contain suitable pressure transmitting fluid, as oil, a plunger 15 being arranged within the cylinder and provided with a stem 16 projecting from the cylinder. This stem engages the rear side of the pawl 10.

A spring 17 holds the pawl yieldingly against the plunger 16. The pressure gage 18 which is shown conventionally in the drawing is connected to the cylinder by means of the pipe 19 so that the pressure transmitted through the levers and the pawl to the drum is indicated on the gage 18.

To prevent rotation of the drum when the vehicle wheel is positioned thereon, I provide a drum holding brake shoe 20 which is of tapered cross section and disposed between the drums to coact with both. This shoe is supported by the vertically reciprocating rod 21 on which is a coiled spring 22 acting to disengage the brake shoe.

The lever 23 pivoted at 24 is provided with an arm 25 connected to the lower end of the brake rod 21 so that the drums may be easily held against rotation. Skidways or tracks 26 and 27 are provided so that the vehicle may be driven upon the drums.

I also provide a brake setting means comprising a fluid cylinder 28 having a plunger 29 adapted to engage the brake pedal 30. Projecting from the end of the cylinder is a sectional screw 31 having a turn buckle 32. The cylinder is provided with a pressure gage 33. This enables the setting of the brakes at any desired pressure so that they may be tested to determine their efficiency, also for equalizing brakes and for various adjustments which may be required.

I have illustrated and described my improved brake testing apparatus in an embodiment which I consider very desirable. I have not attempted to illustrate or describe various modifications and adaptations which I contemplate as I believe this disclosure will enable those skilled in the art to embody or adapt my improvements as may be desired.

Having thus described my invention what

I claim as new and desire to secure by Letters Patent is:

1. In a brake testing apparatus, the combination of a supporting base, drums rotatably mounted on said base in spaced relation to receive and support a wheel, one of said drums being provided with ratchet teeth, a lever mounted on an axis coinciding with that of the drum having the ratchet teeth, a pawl pivotally mounted on said lever to coact with said ratchet teeth on said drum, a fluid cylinder mounted on said lever and provided with a plunger having a projecting stem engaging said pawl, a spring yieldingly supporting said pawl against said stem, and a pressure gage operatively connected to said cylinder to indicate the pressure exerted on the fluid therein.

2. In a brake testing apparatus, the combination of a supporting base, drums rotatably mounted on said base in spaced relation to receive and support a wheel, one of said drums being provided with ratchet teeth, a lever mounted on an axis coinciding with that of the drum having the ratchet teeth, a pawl pivotally mounted on said lever to coact with said ratchet teeth on said drum, a fluid cylinder mounted on said lever and provided with a plunger having a projecting stem engaging said pawl, a spring yieldingly supporting said pawl against said stem, a pressure gage operatively connected to said cylinder to indicate the pressure exerted on the fluid therein, a holding brake shoe for said drums disposed between them to coact with both, a vertically reciprocating supporting rod for said holding brake shoe, a spring arranged on said rod to urge said holding brake shoe to disengaged position, and a hand lever operatively connected to said rod for actuating said holding brake shoe.

3. In a brake testing apparatus, the combination of drums rotatably mounted in spaced relation to receive and support a wheel, one of said drums being provided with ratchet teeth, a lever provided with a pawl coacting with said ratchet teeth on said drum, a fluid cylinder mounted on said lever and provided with a plunger operatively associated with said pawl, and a pressure gage operatively connected to said cylinder to indicate the pressure exerted on the fluid therein.

4. In a brake testing apparatus, the combination of drums rotatably mounted in spaced relation to receive and support a wheel, one of said drums being provided with ratchet teeth, a lever mounted on an axis coinciding with that of the drum having the ratchet teeth, a pawl on said lever coacting with the ratchet teeth on said drum, and a fluid cylinder mounted on said lever and provided with means to indicate the pressure exerted on the fluid therein, said fluid cylinder having a plunger operatively associated with said pawl.

5. In a brake testing apparatus, the combination of a pair of drums mounted in spaced relation to receive and support a wheel, a lever having a pawl and ratchet connection to one of said drums, and a pressure gage means subject to the thrust of said pawl.

6. An automobile brake tester including frames having wheel receiving drums adapted to receive a pair of automobile wheels at a time, bridge members for permitting the wheels to be driven up on to said frames, means for holding the wheel receiving drums stationary while the automobile is driven onto the same, and force gaging means whereby one of the drums of each frame may be rotated to rotate the wheels of the automobile individually and indicate the pressure required to rotate the wheel against its braking action.

In witness whereof I have hereunto set my hand.

HARRY MORGAN.